Nov. 7, 1961  J. R. SCHNEIDER  3,008,137
INTERVAL MEASURING APPARATUS
Filed June 17, 1957  2 Sheets-Sheet 1
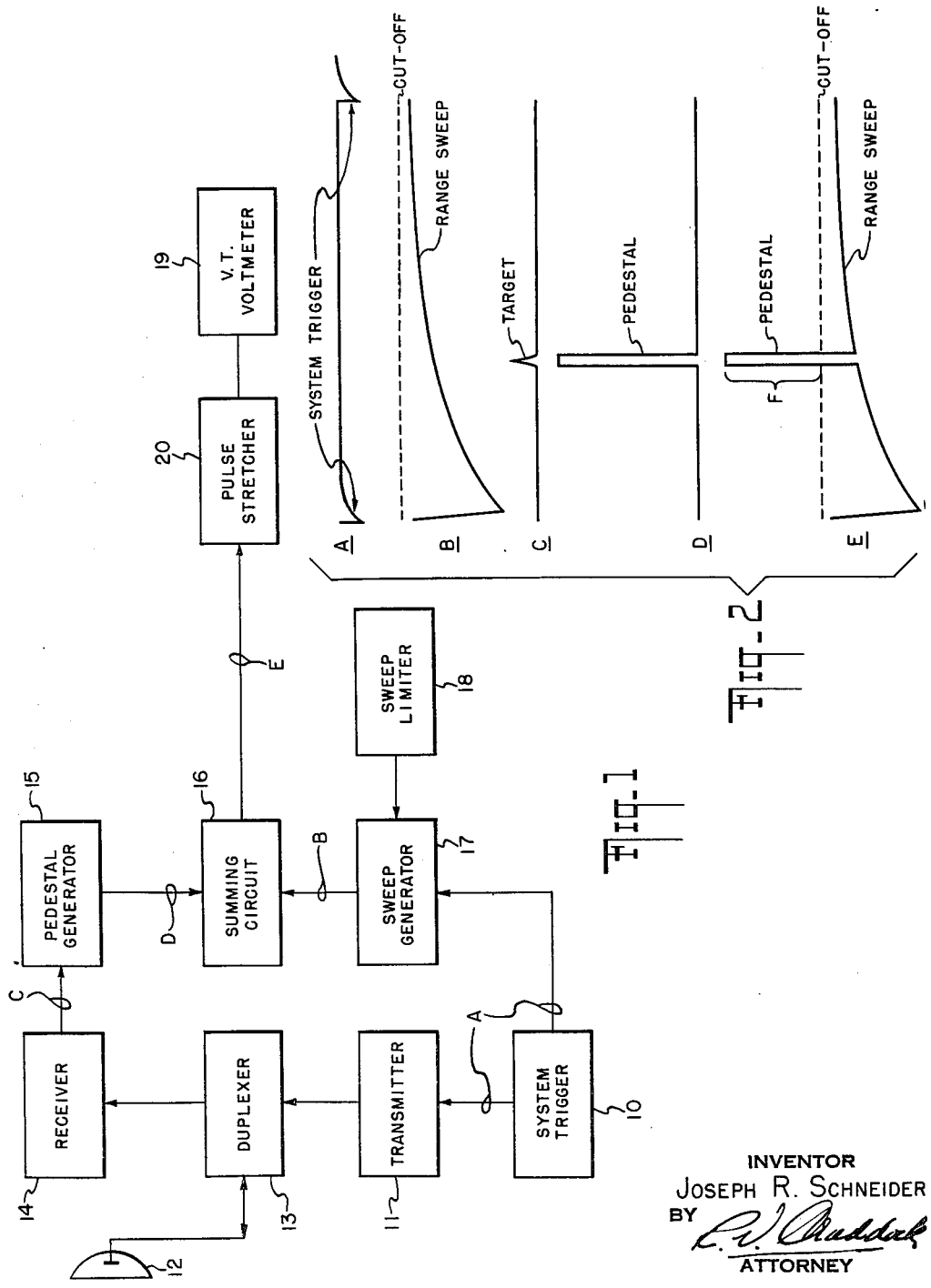
INVENTOR
JOSEPH R. SCHNEIDER
BY
ATTORNEY Nov. 7, 1961  J. R. SCHNEIDER  3,008,137
INTERVAL MEASURING APPARATUS
Filed June 17, 1957  2 Sheets-Sheet 2
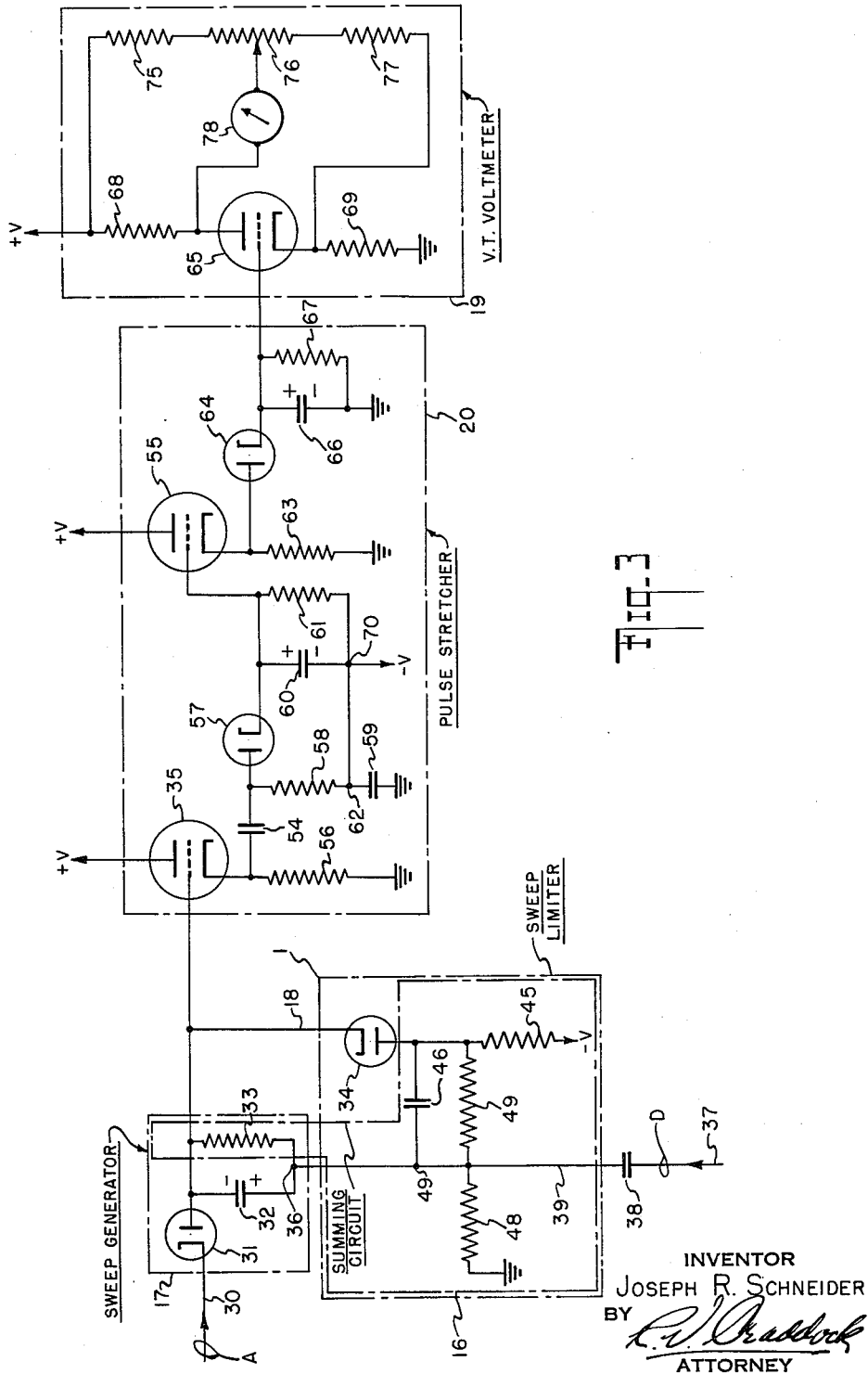
INVENTOR
JOSEPH R. SCHNEIDER
BY
ATTORNEY

United States Patent Office 3,008,137
Patented Nov. 7, 1961

3,008,137
INTERVAL MEASURING APPARATUS
Joseph Raymond Schneider, Larchmont, N.Y., assignor to Sperry Rand Corporation, a corporation of Delaware
Filed June 17, 1957, Ser. No. 667,307
8 Claims. (Cl. 343—13)

This invention relates to interval measuring apparatus and more particularly it relates to a pulse amplitude measuring apparatus for the determination of the time interval between a pair of pulses whereby, for example, the distance between a search radar and a target or the distance between an interrogating radar and a beacon type transponder may be measured.

Prior art distance measuring equipment involves the peak amplitude measurement of a sawtooth wave which is initiated by the transmitted radar pulse and terminated by the received target pulse. In the prior art devices, in the event no target pulse is received, an erroneously high range indication is produced since there is no proper termination of the sawtooth wave.

The present invention overcomes the objection of the prior art devices as it will not indicate an erroneously high range measurement in the event that a target pulse is not received for a given transmitted pulse. Briefly, the present invention includes a range sweep wave, preferably in the form of a sawtooth voltage, synchronously initiated with a radar pulse. The sawtooth voltage of the range sweep wave is preferably as linear as possible and is maintained below a threshold value. A predetermined amplitude reference pulse, preferably in the form of a pedestal, is generated at the time that the target or reply pulse is received back at the radar receiver. The time of occurrence of the reference pedestal, therefore, depends upon the radio travel time or distance between the radar and the target. The reference pedestal is superimposed upon the sawtooth voltage produced within the structure of the present apparatus. The reference pedestal has a predetermined amplitude such that, at least within the range to be measured, the combination of the pedestal voltage and the sawtooth voltage always exceeds the threshold value to thereby provide an output in accordance with the combined peak amplitude that is indicative of the elapsed time interval. The peak amplitude output of the reference pedestal and sawtooth voltage combination is then stretched and measured by a peak reading indicator such as a vacuum tube voltmeter to provide a measure which may be equated to distance. The voltmeter scale may be calibrated in miles or any convenient distance unit. Thus, the present invention produces an output only when the reference pedestal in superposition with the sawtooth voltage exceeds the threshold value. If desired, the calibration of the vacuum tube voltmeter may take care of any non-linearity of the sawtooth voltage. For those applications where multiple target returns are to be expected, conventional gating techniques could be utilized to pass only those returns which occur, for example, at a prescribed time after the initiation of the range sweep.

It is an object of the present invention, therefore, to provide an interval measuring apapratus that will not indicate an erroneously high range measurement in the event that a target pulse is not received for a given transmitted pulse.

It is a further object of the present invention to provide an interval measuring apparatus which is extremely accurate, yet relatively simple, in operation and design.

These and other objects of the present invention will become apparent from a reading of the specification and the accompanying drawings, in which like reference characters indicate like elements, wherein—

FIG. 1 is a block diagram illustrating the present invention;
FIG. 2 illustrates the waveforms of the voltages associated with FIG. 1; and
FIG. 3 is a schematic diagram of an embodiment of the invention of FIG. 1.

Referring now to FIG. 1, the invention is illustrated for purposes of example in a radar system environment where it will be particularly described as applied to a pulsed echo distance measuring system for determining the time interval between the transmission of a pulse and the reception of the pulse after reflection from a target or other reflecting object or surface. A radar system trigger 10 is connected to provide a signal to a radar transmitter 11. Transmitter 11 is connected to provide a signal to radiating and receiving antenna 12 via duplexer 13. Receiver 14 is connected to duplexer 13 and responsive thereto to provide a signal to pedestal generator 15. Pedestal generator 15 is connected to summing circuit 16 for providing a signal thereto in accordance with the output of receiver 14.

Radar system trigger 10 is also connected to provide a signal to sweep generator 17 which, in turn, connects to summing circuit 16 thereby providing a sweep wave thereto initiated synchronously with the system trigger. Sweep limiter 18 connects to sweep generator 17 to initiate the sweep wave at a predetermined potential. Vacuum tube voltmeter 19 is connected to be responsive to the summing circuit 16 via pulse stretcher 20.

The operation of the system shown in FIG. 1 will now be described with reference to the wave forms shown in FIG. 2. System trigger 10 initiates a system trigger pulse waveform A that activates radar transmitter 11 to radiate a radar pulse via duplexer 13 and antenna 3. Trigger pulses A will usually occur periodically with a definite pulse repetition frequency but may occur at random always separated by a time interval corresponding to maximum range. Simultaneously system trigger 10 activates sweep generator 17 to initiate a sawtooth range sweep waveform B. Target or reply pulses, shown as waveform C, are received by antenna 12 and are applied via duplexer 13 to receiver 14 which activates pedestal generator 15 to produce a predetermined or fixed amplitude reference pulse, shown as pedestal waveform D. The reference pedestals D from pedestal generator 15 are superimposed upon the range sweep B from sweep generator 17 in summing circuit 16 to provide a combined output from summing circuit 16 in the form of waveform E.

In order to insure that the maximum negative excursion of range sweep B is fixed at some predetermined value, sweep limiter 18 may be included in the system. With the negative starting point of range sweep B determined and with range sweep B initiated synchronously with system triggers A, a measurement of the peak amplitude of the resultant superimposed pedestal D on sweep wave B is, therefore, indicative of the range at which the radar target is situated.

The superimposed waveform E from summing circuit 16 is applied to pulse stretcher 20. Pulse stretcher 20 may comprise a plurality of cathode followers, diodes and RC stretching circuits wherein the capacitors quickly charge to the approximate peak amplitude of the input pulse and discharge slowly by virtue of the long RC time constant discharge path to be described more fully in relation to FIG. 3. Additionally, the cathode followers are biased negatively beyond cutoff such that in the absence of pedestals D there is no output from pulse stretcher 20. Thus, only the magnitude of pedestals D which exceed the negative cutoff threshold, i.e. F of waveform E, of the pulse stretcher cathode followers produces output pulses from the first pulse stretcher-cathode follower. After suitable successive stages of pulse stretching, the peak amplitude of the voltage stored on the pulse stretcher capacitors is read by a peak reading vacum tube voltmeter 19 or other suitable indicator having a scale calibrated in some convenient distant unit.

Referring now to FIG. 3, a detailed embodiment of the invention shown in FIG. 1 is disclosed. System triggers A from system trigger 10, as shown in FIG. 1, are applied via lead 30 to the cathode of diode 31 of sweep generator 17. The plate of cathode 31 is connected to one side of condenser 32, one end of resistor 33, the cathode of diode 34 and to the grid of cathode follower 35. The other side of condenser 32 and the other end of resistor 33 are joined together at junction 36. Diode 31, condenser 32 and resistor 33 comprise sweep generator 17.

Reference pedestal D from pedestal generator 15, as shown in FIG. 1, is applied via lead 37 to one side of coupling condenser 38; the other side of condenser 38 is connected via lead 39 to junction 36. The plate of diode 34 is connected via resistor 45 to a suitable negative potential. Condenser 46 has one side connected to the plate of diode 34, while its other side is connected to lead 39. The end of resistor 45 connected to the plate of diode 34 also connects to one end of resistor 47. The other end of resistor 47 connects to one end of resistor 48 at junction 49. The other end of resistor 48 is connected to ground potential. The junction 49 of resistors 47 and 48 also connects to lead 39.

Diode 34, condenser 46 and the resistive bleeder network consisting of resistors 45, 47 and 48 comprise sweep limiter 18. Resistor 33 of sweep generator 17 and condenser 46 with resistors 45, 47 and 48 of sweep limiter 18 serve a dual purpose to form summing circuit 16. The detailed circuitry shown for summing circuit 16, sweep generator 17 and sweep limiter 18 is merely for purposes of example since other forms of these circuits may be utilized as would be well known to one skilled in the art. In particular, it would be obvious to those skilled in the art to provide a summing circuit, sweep generator and sweep limiter without overlapping and common components more as shown in FIG. 1. Further, means for summing the sweep and the pedestal signals may be incorporated into either the sweep generator or the pedestal generator.

The plates of cathode followers 35 and 55 of pulse stretcher 20 are connected to a suitable source of positive potential. The cathode of cathode follower 35 is connected through resistor 56 to ground and via coupling capacitor 54 to the plate of diode 57. One end of resistor 58 is connected to the plate of diode 57 while the other end thereof is connected to one side of condenser 59 at junction 62. The other side of condenser 59 is connected to ground. The cathode of diode 57 is connected to the grid of the second cathode follower 55 of pulse stretcher 20. The cathode of diode 57 is also connected to the positive side of condenser 60 and to one end of resistor 61. The negative side of condenser 60 is connected to a suitable negative potential and to the other end of resistor 61 at junction 70. Junction 70 is connected to the junction 62 of resistor 58 and condenser 59.

The cathode of cathode follower 55 is connected to ground via resistor 63 and is also connected to the plate of diode 64. The cathode of diode 64 is connected to the grid of cathode follower 65 of vacuum tube voltmeter 19. The cathode of diode 64 is also connected to the positive side of condenser 66 and one end of resistor 67. The negative side of condenser 66 is connected to ground and to the other end of resistor 67.

The plate of cathode follower 65 of voltmeter 19 is connected via resistor 68 to a suitable positive potential while the cathode thereof is returned to ground via resistor 69. Connected between the end of resistor 68 that connects to the positive potential and the cathode of cathode follower 65 are serially connected resistor 75, potentiometer 76 and resistor 77. Connected between the plate of cathode follower 65 and the slider arm of potentiometer 76 is a microammeter 78.

In operation, system triggers A are applied to the cathode of diode 31 of sweep generator 17 via lead 30 from system trigger 10, as shown in FIG. 3. The negative trigger pulses A charge sweep generator condenser 32 in the polarity indicated. In the event that the charge across condenser 32 exceeds a predetermined maximum negative value as established by the back bias of sweep limited diode 34, diode 34 will conduct, placing such excess negative charge on sweep limiter condenser 46. Condenser 46 is selected to have a very much larger capacity than sweep generator condenser 32, such that only a small voltage appears across sweep limiter condenser 46 in the normal operation of the system. The discharge path for sweep limiter condenser 46 is through resistor 47 and is such that whatever charge appears across condenser 46 can leak off during the interval between the occurrence of system triggers A. Thus, the maximum negative voltage at which range sweep waveform B originates is determined.

Target pulses C initiate reference pedestal pulses D in pedestal generator 15, as shown in FIG. 1. Reference pedestal D is applied by lead 37 via coupling condenser 38 and lead 39 to junction 36 situated within sweep generator 17. The resultant superimposed pedestal and range sweep waveform E is then applied to the grid of the first cathode follower 35 of pulse stretcher 20. The grid of cathode follower 35 is permanently biased below cutoff by means of resistors 33, 47 and 45 such that no output is produced across resistor 56 unless the negative cutoff threshold is exceeded, such as by portion F of superimposed waveform E. Sawtooth range sweep B, by itself, can never exceed the cutoff threshold of cathode follower 35. However, the superimposed waveform E will always have a peak resultant magnitude sufficient to overcome the cutoff bias of cathode follower 35 irrespective of the time position of pedestal D with respect to range sweep B. Thus, an output is produced across resistor 56 whenever a pedestal D is generated.

In operation, only the amplitude of portion F of the superimposed waveform E which lies above the cutoff bias of cathode follower 35 appears across output resistor 56. The output across resistor 56 is applied via coupling capacitor 54 to the plate of diode 57 thence to condenser 60 and resistor 61. Condenser 60 is quickly charged to approximately the peak value of the output pulse F appearing across resistor 56 because of the low impedance charging path for condenser 60 through diode 57. The high resistance discharge path for condenser 60 through resistor 61 causes condenser 60 to hold its approximate peak value of voltage for a relatively long length of time. Condenser 59 is employed as a large by-pass power supply decoupling filter.

The voltage appearing across condenser 60 is applied to the grid of the second cathode follower 55 which, in turn, produces an output across resistor 63 that is applied to diode 64, condenser 66 and resistor 67. The operation of diode 64, condenser 66 and resistor 67 is similar to that described for the preceding diode and resistor circuit interposed between cathode followers 35 and 55. The only difference in operation is one of degree, namely that the capacity of condenser 66 is much greater than that of condenser 60, such that the peak value to which condenser 66 charges is held for an even greater time than that held by condenser 60. Thus, pulse F which is applied to the grid of cathode follower 35 is effectively stretched by the operation of the pulse stretcher circuitry 20.

The amplitude of stretched pulse F is then measured by vacuum tube voltmeter 19 which is represented by cathode follower 65, resistors 68, 69, 75 and 77, potentiometer 76 and microammeter 78. The last mentioned components comprise a conventional vacuum tube voltmeter circuit such that the deflection of microammeter 78 is proportional to the time location of reference pedestal D with respect to the start of range sweep B which, in turn, is determined by the range at which the radar target is situated.

Cathode followers 35 and 55 are required in order that sufficient current can be supplied to stretching condensers 60 and 66, respectively, in response to input pulses F to cathode follower 35, as the pulses F generally have insufficient energy alone to charge the progressively larger capacities of condensers 60 and 66.

By perusal of the specification and the drawings, it will be obvious to those skilled in the art that the apparatus disclosed in FIG. 1 may include a beacon transponder located at the target's position. Thus, the application of the subject invention to a search radar system, or a radar beacon system, is immaterial. Either a search radar (passive target) or a beacon radar (active target) system may be employed satisfactorily as the environment of the present invention without affecting its scope.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In apparatus for measuring the time interval between two pulses, means for generating a predetermined range sweep synchronously with system trigger pulses, means for generating a predetermined amplitude pedestal pulse synchronously with received target echo pulses, means for providing a summated signal in accordance with said range sweep and said pedestal pulse whereby the amplitude of said summated signal is a function of distance, and means for measuring the amplitude of said summated signal whereby a measure of distance is determinable.

2. Interval measuring apparatus comprising first and second sources of signal, means responsive to said first signal source for producing a predetermined sweep waveform in accordance therewith, means responsive to said second signal source for producing a predetermined amplitude pedestal waveform in accordance therewith, means for summing said waveforms and producing a superimposed output in accordance therewith, and means responsive to said superimposed output for reading peak voltage whereby the time interval between the initiation of said sweep waveform and said pedestal waveform is determinable.

3. In combination with distance measuring equipment, transmitting means, sweep generating means adapted to be triggered synchronously with said transmitting means for producing an output in accordance therewith, receiving means, pedestal generating means adapted to be responsive to said receiving means and operative to produce an output in accordance therewith, summation means responsive to the outputs from said signal generating means and said pedestal generating means for producing an output in accordance with the sum thereof, and peak reading indicator means responsive to the summated output for indicating distance.

4. A pulse amplitude measuring device comprising a radar transmitter, a sweep generator adapted to be triggered synchronously with the radar transmitter for producing a range sweep, a pedestal generator responsive to target echo pulses for producing a pulse of predetermined amplitude in response thereto, summation means responsive to said pulse and said sweep for producing a summated output signal in accordance therewith, pulse stretching means responsive to the summated output signal for producing a substantially constant stretched output signal in accordance therewith, and means responsive to said stretched signal for reading peak voltage amplitude.

5. In a distance measuring system, a radar transmitter, sweep generating means for providing a range sweep, sweep limiting means operably coupled to the sweep generating means for limiting the maximum negative excursion of said range sweep, triggering means adapted to synchronously trigger the radar transmitter and the sweep generating means, a radar receiver adapted to receive target echo pulses and operative to provide an output in accordance therewith, pedestal generating means responsive to the output from the receiver for producing a pulse of predetermined amplitude in response thereto, summatoon means responsive to the outputs from the sweep generating means and the pedestal generating means for producing an output in accordance with the summation thereof, pulse stretching means responsive to the summated signal for producing an output in accordance therewith, and an indicating means responsive to the output from the pulse stretching means for indicating peak voltage amplitude in terms of distance.

6. In a distance measuring system of the character described in claim 5 including biasing means whereby the indicating means is operative only when said pedestal generating means produces a pulse.

7. In a distance measuring system of the character described in claim 5 wherein the pulse stretching means includes quick charging and slow discharging RC circuits for providing a substantially constant output signal to said indicating means.

8. In apparatus for measuring the time interval between two pulses, means for generating a range sweep synchronously with system trigger pulses, means operably coupled to the sweep generating means for limiting the maximum negative excursion of said range sweep, means for generating a predetermined amplitude pedestal pulse synchronously with received target echo pulses, summation means responsive to the outputs from the sweep generating means and the pedestal generating means for superimposing the pedestal pulse on the range sweep, and means including indicating means responsive to the output from the summation means for indicating the amplitude of the superimposed pedestal pulse and range sweep in terms of distance whereby a measure of distance is indicated only when a target echo pulse is received.

References Cited in the file of this patent

UNITED STATES PATENTS 2,852,769    Plouffe ---------------- Sept. 16, 1958